(12) United States Patent
Brzozowski

(10) Patent No.: US 8,250,124 B2
(45) Date of Patent: Aug. 21, 2012

(54) ASSIGNING CONTENT TO AN ENTRY IN DIRECTORY

(75) Inventor: Michael J. Brzozowski, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 563 days.

(21) Appl. No.: 12/362,312

(22) Filed: Jan. 29, 2009

(65) Prior Publication Data

US 2010/0191782 A1 Jul. 29, 2010

(51) Int. Cl.
*G06F 7/00* (2006.01)
(52) U.S. Cl. .................. 707/828; 707/755; 707/758
(58) Field of Classification Search .............. 707/755, 707/758, 828
See application file for complete search history.

(56) References Cited

U.S. PATENT DOCUMENTS

| 6,339,795 | B1 * | 1/2002 | Narurkar et al. | 709/246 |
| 2003/0135826 | A1 * | 7/2003 | Dozier | 715/515 |
| 2005/0091287 | A1 * | 4/2005 | Sedlar | 707/200 |
| 2007/0027672 | A1 * | 2/2007 | Decary et al. | 704/7 |
| 2007/0136429 | A1 | 6/2007 | Fine et al. | |

* cited by examiner

*Primary Examiner* — Cheyne Ly

(57) ABSTRACT

A method of assigning content with an entry in a directory includes parsing the content into text phrases. Mappings between each entry in the directory and information in name fields of the directory are determined. Name proposals for a phrase are determined using the mappings. Each name proposal identifies a potential match between the content and one or more entries in the directory. The content is assigned to an entry in the directory associated with a name proposal of the one or more name proposals.

24 Claims, 4 Drawing Sheets

ASSIGNING CONTENT TO AN ENTRY IN DIRECTORY

BACKGROUND

Content is produced daily in a variety of formats (e.g. blogs, forums, wiki edits, bookmarks, reports, presentations, etc.). A variety of venues are emerging for people to share this content, varying by effort involved and formality. The volume of content produced makes it difficult for potential content users to stay informed of new posts of interest. While the diversity of venues makes publishing easier, it makes discovering new content of interest more difficult, as users must monitor multiple sources.

Additionally, finding all content associated with an author is relatively difficult, because not all publishing systems include sufficient metadata to uniquely map content back to a specific author. As a result, it's difficult to identify a person's expertise or to search for content by similar people, such as people in the same specialty or people in the same organizational unit.

BRIEF DESCRIPTION OF DRAWINGS

The embodiments of the invention will be described in detail in the following description with reference to the following figures.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

According to an embodiment, content from a variety of sources is scanned for entities or information matching a directory of people. The content may include blog entries, forum posts, wiki edits, technical reports, or any content in electronic format that may or may not be on the Internet The content may be in electronic documents, RSS feeds, or other electronic formats. The content is scanned for directory matches. A directory is listing of people and attributes for the people. The directory may be provided in a database or other data structure. The listing of people and their attributes may include a unique ID for each person (e.g., an employee ID), first name, middle name, last name, nicknames, email address, organization unit, geography, specialty, or other attributes. If the directory is for an organization, the organizational structure may be stored in the directory, and an attribute may be where the person is located in the organization, such as executive, engineer, organization unit name, etc.

The scanned and parsed content is matched with the people and attributes in the directory. Then, when a match is found, the content is associated with the person or people in the directory. In many situations, content may match multiple people in the directory. According to an embodiment, a mapping procedure is initially performed to map names and nicknames to people or entries in the directory, and a matching process is used to identify the person that is most likely to match the content based on the mappings. A system, according to an embodiment aggregates content from multiple sources, including dynamic content streams, identifies references to people in the directory, matches items with referenced people, and filters content back out into new streams or stores content as associated with people according to directory criteria. Organizations and people can use the system to identify "people like me" or to explore disparate parts of the organization, and to discover resources or people that may be relevant to the searcher.

Figure 1:
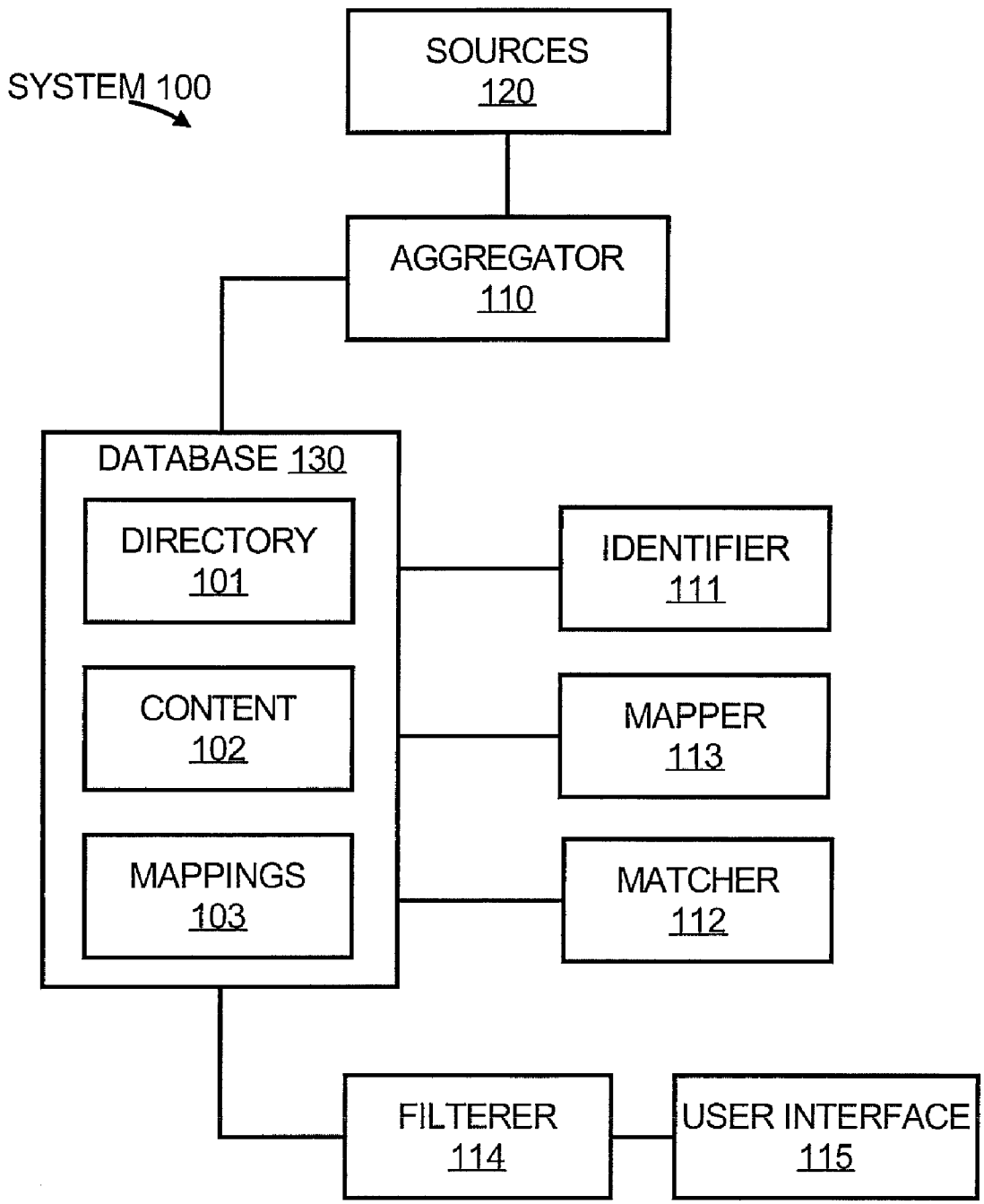
FIG. 1 illustrates a system, according to an embodiment.

FIG. 1 illustrates a system 100, according to an embodiment. The system 100 includes a directory 101, an aggregator 110, an identifier 111, a matcher 112, a mapper 113, and a filterer 114. Sources 120 include multiple sources of content. The sources 120 may include sources on the Internet or sources that distribute content through another means. For example, content may be distributed in data streams, such as RSS feeds, web pages, or provided in traditional office documents.

The aggregator 110 aggregates content from the sources 120. For example, the aggregator 110 polls a variety of data streams. The content may be in a text format, or have a textual summary or textual metadata that can be matched with attributes in the directory 101. The polling frequency of the content may be adaptively adjusted based on how often new items are added to it. This may vary from stream to stream or over the course of a week (e.g., in an office setting, many streams slow down over the weekend and spike back up on Monday). Aggregation may include storing the content or metadata for the content from the sources 120. The stored content is shown as 102. The content 102, directory 101, mappings 103 and other information that may be used by the system 100 are stored in a database 130 or other data storage.

The identifier 111 scans fields in the content from the sources 120 likely to contain relevant information, such as names, nicknames, or other information in the directory 101 for matching content with people in the directory 101. For example, in most RSS feeds, the "creator" field implies authorship; in others, the "title" contains the author, while others list the author(s) early in the "description". In one embodiment, a sliding window of multiple words (e.g., nine words) is used to scan the content for names or other information.

The mapper 113 breaks apart all name fields in the directory 101 (e.g., legal name, "common" name, surnames, etc.) into words and builds mappings 103 from word to person. Naturally, most words will map to multiple people. For example, John is mapped to everyone in the directory having John as a first name or middle name.

The matcher 112 matches information from the identifier 111 by scanning relevant fields in the content 102 with the mappings 103 created from the directory 101. For example, name proposals are determined from matches between name fields in the mappings 103 with the scanned information from the identifier 111. The name proposals are potential matches between the content and people in the directory. Ties between name proposals are broken by giving preference to words that match from fields like the "common name" and email address, as these are more likely to represent how people commonly prefer to be called. Sometimes, people can't be uniquely identified by name alone, e.g., there may be 20 John Smiths in the directory 101. In these cases, the content is scanned for other people who have been uniquely identified in the same document, such as coauthors, and give priority to people who are closer in the organization tree higher weights as potential co-authors or matches with the content. Candidates whose probability score above a certain threshold are then matched with the documents they appear in.

The filterer 114 enables many useful filtered views of the aggregated content matched with the directory 101, for example, via a user interface 115. Users can query and view all documents mentioning a specific person, or a workgroup or department. They can filter by any other useful property in the directory 101, such as job function/specialization or geography. And they can filter based on properties of the document itself, such as keyword, type, or source. Users can access these filtered views through the user interface 115, such as a browser or other interface, or subscribe to them as, e.g., RSS feeds. In addition to generating filtered views of the content 102, trends of content posting behavior can be analyzed by any attribute in the directory 101, such as by, person, geography, or specialty, or department. Another use in an organization is to find other people in an organization that may be working on similar projects by filtering the content 120 with certain attributes. For example, documents authored or viewed by people who share some attributes in the directory (for instance, job role/specialty, department, or geography) can be viewed. This overcomes the sparse data one would ordinarily start with when trying to identify people with related interests.

Figure 2:
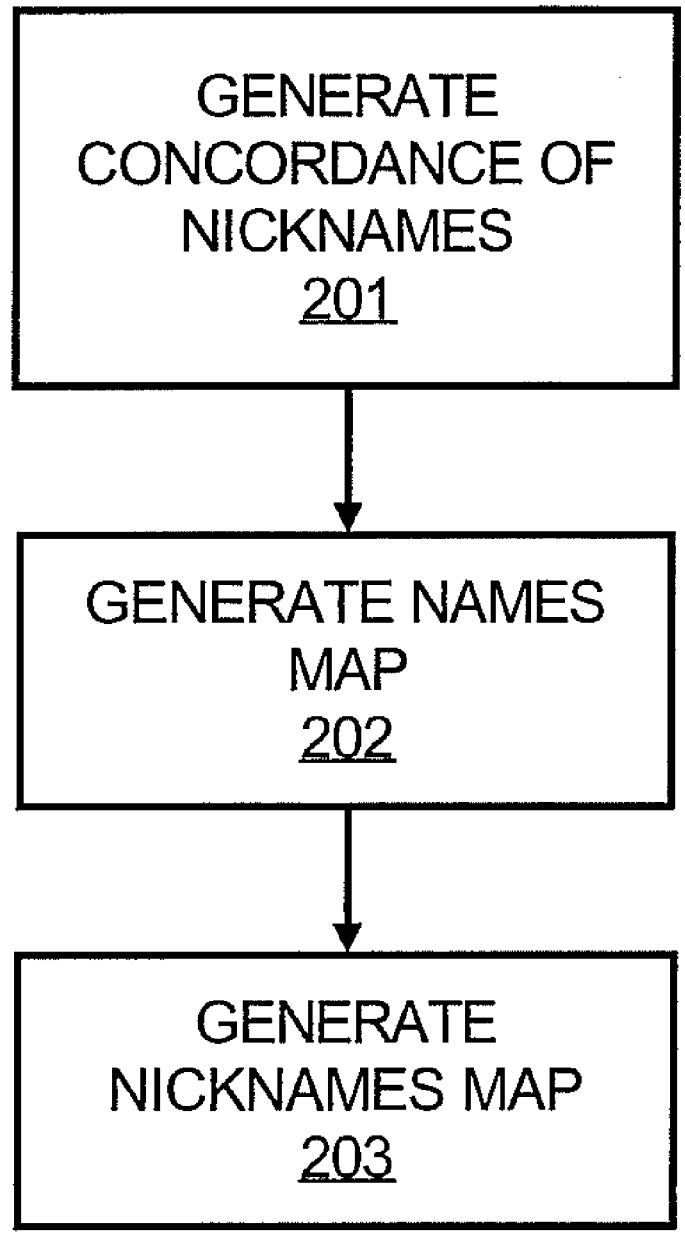
FIG. 2 illustrates a method for determine mappings.

FIG. 2 illustrates a method 200 for generating mappings of attributes to people in a directory, according to an embodiment. The method may be used by the mapper 113 to generate the mappings 103 described with respect to FIG. 1.

At step 201, a concordance of nicknames is generated based on probability distributions determined from entries in the directory 101 and/or other sources. An example of information in an entry in the concordance of nicknames is name, nickname associated with the name, and a probability that the nickname is applied to the name for the person. For example, given a nickname "Pat", entries in the concordance of nicknames for "Pat" might be P("Pat"→Patrick)=60% and P("Pat"→Patricia)=40%. This indicates the probability 60% that "Pat" is a nickname for Patrick, while the other 40% of cases suggest "Pat" refers to Patricia. These probabilities can be determined from other people in the directory 101 having a name Patricia or Patrick, and for each entry determining whether the person indicated that Pat is a nickname they use. This can be done automatically and/or manually and can be augmented with known nicknames or commonly used nicknames in the organization (e.g. "JB"="Joe Bob Johnson" in the labs department of the organization). Note that the concordance of nicknames, and name and nickname mappings described below may be stored in the database 130 as part of the mappings 103 shown in FIG. 1.

At step 202, a names map is generated. For each entry and each name field in the entry, a mapping is determined. This includes identifying each name field in the entry, such as first name, last name, middle name, legal name, nickname, etc. For each name field, the name is standardized, for example, by removing any accents and converting to lower case. A mapping is generated for each token in the name field. A token is a categorized block of text. For example, each mapping includes a unique ID of the directory entry (e.g., employee ID), the canonized name/token in the field, and the field name. For example, a mapping from the name to the employee ID includes ("Gerald Smith"→#1151; legal name). Tokens for the legal name are Gerald and Smith, and a mapping can be created for each token, e.g., ("Gerald"→#1151, "Smith"→#1151; legal name).

At step 203, a nicknames map is generated from the entries in the concordance of nicknames and the names map. For each entry in the nickname concordance, e.g., P("Pat"→Patrick)=60%, add mappings from the nickname to each of the resulting values in the names map for the given name. For example, each entry in the names map for Patrick is added to the nicknames map for "Pat" with probability 60%. Thus, an entry in the nicknames map identifies entries in the names map all having the same name as an entry in the concordance of nicknames, and also includes the probability from the entry in the concordance of nicknames.

Figure 3:
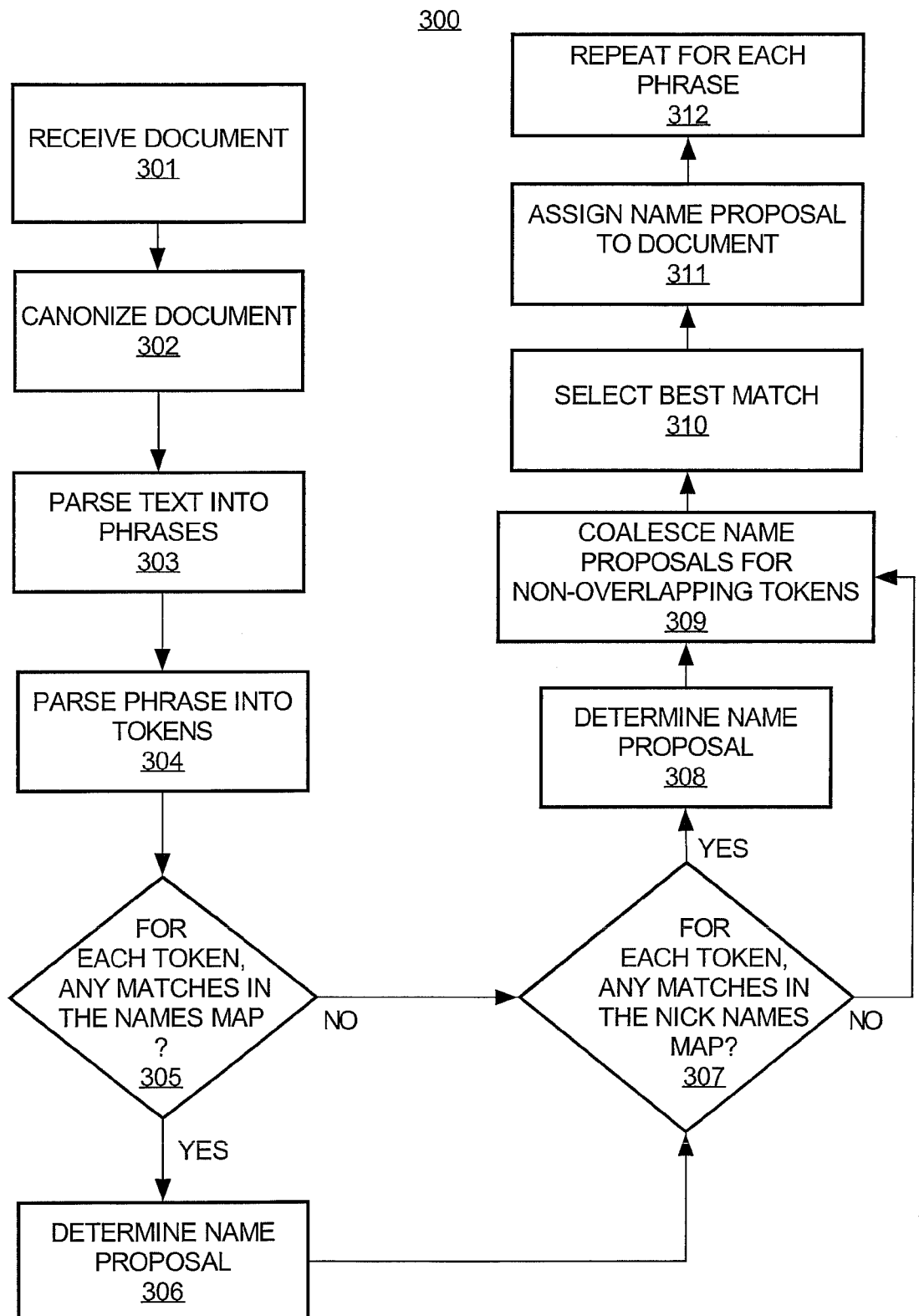
FIG. 3 illustrates a method for determining a best match, according to an embodiment.

FIG. 3 illustrates a method 300 for matching content with people in the directory using the mappings generated by the method 200, according to an embodiment. The steps of the method 300 may be performed by the matcher 112 shown in FIG. 1.

At step 301, a document is received. The document is a piece of content (e.g., word processing document, PDF document, document or content in RSS feed, etc.) received from one of the sources 120.

At step 302, the text is standardized, i.e., made uniform. For example, accents are removed from text, and text is converting to lower case. The canonizing is implementation-specific and dependent on how names are stored in the directory 101 for matching.

Steps 303-309 describe generating name proposals for the document. A name proposal is a potential match between a person in the directory 101 and the document. A name proposal may specify a string of one or more words in the text of the document, the ID (e.g., employee ID) for the matching entry in the directory 101, the field in the entry in the directory that matches the string of words, and a probability that the match is accurate. As described below, one or more name proposals may be identified for each phrase of the document. Note that many phrases in the document may not have matches and name proposals because the phrases do not have names. Also, portions of the document known to include names, such as metadata including authors, the first page of the document, etc., may only be searched or may be searched first for potential matches between a person in the directory 101 and the document.

At step 303, text in the document is parsed into phrases, for example, by known delimiters (e.g. ";", "and") that typically do not occur in names.

At step 304, for each phrase, the phrase is parsed into tokens by known delimiters (e.g., spaces, commas) that cannot occur in name words. The token is a block of text that in this case is being categorized into a name field in a directory entry. In many instances, the tokens are single words that may be in a name, such as a first name or a last name.

At step 305, for each token in the phrase, determine whether there are any matches in the names map, which is described in step 202. For each match, include a name proposal at step 306. For k matches, each match is given a probability 1/k. For example, 10 matches (i.e., name proposals) each have a probability of 10%.

At step 307, for each token in the phrase, determine whether there is a match in the nicknames map, which is described in step 203. For each match in the nicknames map (e.g., "Pat"), at step 308, replace the nickname with the expanded name (e.g., Patrick, Patricia), scaled by the probability of the nickname→given name mapping (e.g., P("Pat"→Patrick)=60%). In other words, the token, which is the nickname, is replaced with expanded name and probability. This expanded name and probability is a name proposal.

At step 309, name proposals for adjacent non-overlapping tokens within a window size are coalesced and a probability is determined for each coalesced name proposal. The window size may be determined based on an estimated longest length of a name. An example of coalescing name proposals is as follows, for non-overlapping adjacent tokens including "Smith, Michael", employees matching both "Smith" and "Michael" are considered as matches (i.e., name proposals) even if they don't match "Smith Michael". The probability of these new joint proposals for a set of tokens T is scaled up relative to all the candidates for T. For example, the probability is the sum of all the component probabilities of the proposals within T, divided by the sum of all the joint proposal scores for T.

At step 310, a name proposal for each token that that is most likely a correct match for a person/entry in the directory 101 is determined. This includes determining a best match for name proposals and coalesced name proposals. The highest-scoring or highest-probability name proposal for each token is determined. When name proposals with close probabilities or scores are identified, one may be selected based on linking metrics, which identify the closeness of a person to unambiguously identified "anchors". One metric is the inverse of the distance between people along the organization tree, i.e. 1/pathLength, where pathLength=1 for an employee's manager and coworkers. Name proposals whose probabilities are below a certain threshold, e.g., 50% are discarded.

At step 311, the matching name proposal determined at step 310 is assigned to the content. For example, a mapping of document ID to employee ID is stored, along with debugging metadata, such as where in the text the matching occurred and which directory field was most influential. The matching person from the directory 101, for example, may be an author of the document.

At step 312, the steps 303-311 are repeated for each phrase until the entire document is parsed. Then, the method 300 can be repeated for each document.

Figure 4:
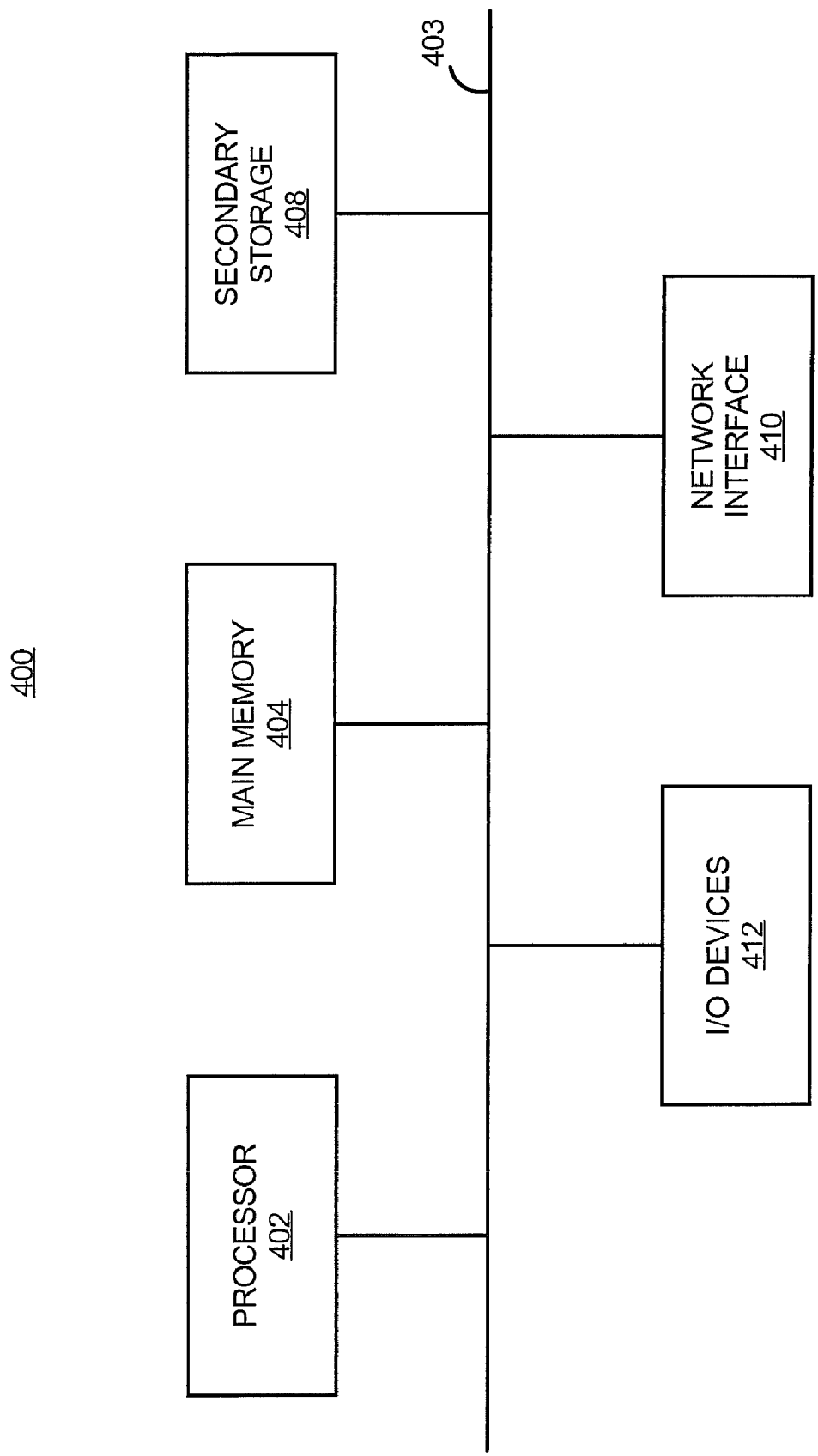
FIG. 4 illustrates a computer system that may be used a platform for the systems and methods of the embodiments.

FIG. 4 illustrates a block diagram of a general purpose computer system 400 that is operable to be used to execute one or more computer programs implementing the embodiments described herein, including steps described herein. The computer system 400 may be used as a platform for the system 100. It will be apparent to one of ordinary skill in the art that a more sophisticated computer system is operable to be used. Furthermore, components can be added or removed from the computer system 400 to provide the desired functionality.

The computer system 400 includes one or more processors, such as processor 402, providing an execution platform for executing software. Commands and data from the processor 402 are communicated over a communication bus 403. The computer system 400 also includes computer readable storage mediums including a main memory 404, such as a Random Access Memory (RAM), where software is resident during runtime, and a secondary storage 408. The secondary storage 408 includes, for example, a hard disk drive and/or a removable storage drive representing a floppy diskette drive, a magnetic tape drive, a compact disk drive, etc., or a nonvolatile memory where a copy of the software is stored. In one example, the secondary storage 408 also includes ROM (read only memory), EPROM (erasable, programmable ROM), EEPROM (electrically erasable, programmable ROM). The computer system 400 includes one or more input/output (I/O) devices 412, such as a display, keyboard, a mouse, a stylus, and the like. A network interface 410, wired and/or wireless, is provided for communicating with other computer systems.

One or more of the steps of the methods described herein and other steps described herein and one or more of the components of the systems described herein may be implemented as software code stored on a computer readable medium, such as the memory and/or secondary storage, and executed on a computer system, for example, by a processor. For example, the steps of the embodiments may exist as software program(s) comprised of program instructions in source code, object code, executable code or other formats for performing some of the steps. Any of the above may be embodied on a computer readable medium, which include storage devices. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes.

While the embodiments have been described with reference to examples, those skilled in the art will be able to make various modifications to the described embodiments without departing from the scope of the claimed embodiments.

What is claimed is:

1. A non-transitory computer readable medium including code that when executed by a computer system performs a method of assigning content with an entry in a directory, the method comprising:
   receiving content;
   parsing the content into text phrases;
   determining mappings between each entry in the directory and information in name fields of the directory;
   for each phrase, determining one or more name proposals for the phrase using the mappings, wherein each name proposal identifies a potential match between the content and one or more entries in the directory; and
   assigning the content to an entry in the directory associated with a name proposal of the one or more name proposals,
   wherein, if the one or more name proposals identify a plurality of potential matches, each of the potential matches is provided with a probability based on a total number of the potential matches, and the associated name proposal is selected based on the probabilities.

2. The computer readable medium of claim 1, wherein the mappings are associations between entries in the directory and the information in the name fields, and determining mappings comprises:
   for each entry in the directory, determining one or more mappings between information in each name field of the directory and entries in the directory; and
   storing the mappings in a names map.

3. The computer readable medium of claim 2, wherein determining mappings comprises:
   determining a concordance of nicknames;
   for nicknames in the concordance of nicknames, determine nickname mappings between the nicknames and the information from name fields in the mappings of the names map; and
   storing the nickname mappings in a nicknames map,
   wherein each of the nicknames includes a probability that the nickname is for a predetermined name.

4. The computer readable medium of claim 3, wherein determining one or more name proposals for the phrase using the mappings comprises:
   using the names map and the nicknames map to determine the one or more name proposals.

5. The computer readable medium of claim 1, wherein determining one or more name proposals for the phrase using the mappings comprises:
   parsing each phrase into tokens; and
   determining the one or more name proposals for the tokens.

6. The computer readable medium of claim 5, wherein determining one or more name proposals for the phrase using the mappings comprises:
  identifying mappings for adjacent non-overlapping tokens for the phrase; and
  determining the one or more name proposals from the identified mappings for the adjacent non-overlapping tokens.

7. The computer readable medium of claim 5, wherein the tokens in the phrase are identified in a window having a size approximated by a size of a largest name.

8. The computer readable medium of claim 5, wherein each name proposal comprises a string of one or more words in the phrase, an ID for a potential matching entry in the directory, a field in the entry in the directory that matches the string of words, and a probability that the match is accurate.

9. The computer readable medium of claim 1, wherein assigning the content to an entry in the directory associated with a name proposal of the one or more name proposals comprises:
  determining a name proposal from the one or more name proposals that is a best match for the content.

10. The computer readable medium of claim 9, wherein assigning the content to an entry in the directory associated with a name proposal of the one or more name proposals comprises:
  determining the best match from probabilities for each name proposal, wherein the probabilities are an estimate that a name in the name field matches a name in the content.

11. The computer readable medium of claim 9, wherein determining the best match comprises:
  for name proposals having close probabilities, determining whether the content includes a linking attribute that is specific to one of the entries associated with the name proposals having close probabilities; and
  selecting the name proposal having the linking attribute as the best match.

12. The computer readable medium of claim 1, wherein parsing the content into text phrases comprises:
  parsing a portion of the content known to include a name of an author.

13. The computer readable medium of claim 1, further comprising:
  generating a filtered view of different content assigned to entries in the directory based on a user request.

14. A computer system comprising:
  data storage storing a names map and a nicknames map, wherein the names map includes mappings between information in each name field in a directory and entries in the directory, and the nicknames map includes mappings of nicknames to information in name fields in the directory; and
  a processor parsing content into text phrases, determining mappings between each entry in the directory and information in name fields of the directory, determining one or more name proposals for the phrase using the mappings in the names map and nicknames map, wherein each name proposal identifies a potential match between the content and one or more entries in the directory, and assigning the content to an entry in the directory associated with a name proposal of the one or more name proposals,
  wherein each of the nicknames includes a probability that the nickname is for a predetermined name, and the associated name proposal is selected based on the probabilities of the nicknames.

15. A method of assigning content to an entry in a directory, the method comprising:
  receiving content;
  parsing the content into text phrases;
  determining name mappings of names in the directory to entries in the directory and nickname mappings of nicknames to entries in the directory;
  for each phrase, determining, by a processor, one or more name proposals for the phrase using the mappings, wherein each name proposal identifies a potential match between the content and one or more entries in the directory; and
  assigning the content to an entry in the directory associated with a name proposal of the one or more name proposals,
  wherein each of the nicknames includes a probability that the nickname is for a predetermined name, and the associated name proposal is selected based on the probabilities of the nicknames.

16. The method of claim 15, wherein determining one or more name proposals for the phrase using the mappings comprises:
  parsing each phrase into tokens; and
  determining the one or more name proposals from the identified mappings for the adjacent non-overlapping tokens.

17. The method of claim 15, wherein determining one or more name proposals for the phrase using the mappings comprises:
  parsing each phrase into tokens, wherein the tokens in the phrase are identified in a window having a size approximated by a size of a largest name; and
  determining the one or more name proposals for the tokens.

18. The method of claim 15, wherein each name proposal comprises a string of one or more words in the phrase, an ID for a potential matching entry in the directory, a field in the entry in the directory that matches the string of words, and a probability that the match is accurate.

19. The computer system of claim 14, wherein, for determining one or more name proposals for the phrase using the mappings, the processor further:
  parses each phrase into tokens, wherein the tokens in the phrase are identified in a window having a size approximated by a size of a largest name; and
  determines the one or more name proposals for the tokens.

20. The computer system of claim 14, wherein each name proposal comprises a string of one or more words in the phrase, an ID for a potential matching entry in the directory, a field in the entry in the directory that matches the string of words, and a probability that the match is accurate.

21. A non-transitory computer readable medium including code that when executed by a computer system performs a method of assigning content with an entry in a directory, the method comprising:
  receiving content;
  parsing the content into text phrases;
  determining mappings between each entry in the directory and information in name fields of the directory;
  for each phrase, determining one or more name proposals for the phrase using the mappings, wherein each name proposal identifies a potential match between the content and one or more entries in the directory; and
  assigning the content to an entry in the directory associated with a name proposal of the one or more name proposals,
  wherein determining one or more name proposals for the phrase using the mappings comprises:

parsing each phrase into tokens, wherein the tokens in the phrase are identified in a window having a size approximated by a size of a largest name; and determining the one or more name proposals for the tokens.

22. The non-transitory computer readable medium of claim 21, wherein determining one or more name proposals for the phrase using the mappings further comprises:

identifying mappings for adjacent non-overlapping tokens for the phrase; and determining the one or more name proposals from the identified mappings for the adjacent non-overlapping tokens.

23. The non-transitory computer readable medium of claim 21, wherein each name proposal comprises a string of one or more words in the phrase, an ID for a potential matching entry in the directory, a field in the entry in the directory that matches the string of words, and a probability that the match is accurate.

24. The non-transitory computer readable medium of claim 21, wherein assigning the content to an entry in the directory associated with a name proposal of the one or more name proposals comprises:

determining a name proposal from the one or more name proposals that is a best match for the content, wherein determining the best match comprises:

for name proposals having close probabilities, determining whether the content includes a linking attribute that is specific to one of the entries associated with the name proposals having close probabilities; and selecting the name proposal having the linking attribute as the best match.

* * * * *